US008974011B2

(12) United States Patent
Schick et al.

(10) Patent No.: US 8,974,011 B2
(45) Date of Patent: Mar. 10, 2015

(54) TRACTOR HYDRAULIC BRAKE CIRCUIT WITH ABS CAPABILITY

(71) Applicant: Deere & Company, Moline, IL (US)

(72) Inventors: Troy E. Schick, Cedar Falls, IA (US); Boris Volfson, Moline, IL (US)

(73) Assignee: Deere & Company, Moline, IL (US)

( * ) Notice: Subject to any disclaimer, the term of this patent is extended or adjusted under 35 U.S.C. 154(b) by 123 days.

(21) Appl. No.: 13/658,152

(22) Filed: Oct. 23, 2012

(65) Prior Publication Data

US 2014/0110998 A1  Apr. 24, 2014

(51) Int. Cl.
*B60T 8/40* (2006.01)
*B60T 8/17* (2006.01)
*B60T 8/48* (2006.01)
*B60T 11/21* (2006.01)

(52) U.S. Cl.
CPC ............ *B60T 8/1708* (2013.01); *B60T 8/4827* (2013.01); *B60T 11/21* (2013.01)
USPC .................. 303/116.1; 303/11; 303/119.1

(58) Field of Classification Search
USPC .............. 303/3, 9.61, 9.62, 9.65, 11, 113.5, 303/116.1, 119.1
See application file for complete search history.

(56) References Cited

U.S. PATENT DOCUMENTS

| | | | | |
|---|---|---|---|---|
| 4,190,298 A | * | 2/1980 | Klope | 303/2 |
| 4,400,039 A | * | 8/1983 | Ogata | 303/3 |
| 4,685,745 A | | 8/1987 | Reinecke | |
| 4,861,115 A | * | 8/1989 | Petersen | 303/15 |
| 4,898,078 A | * | 2/1990 | Gage et al. | 303/9.61 |
| 5,927,827 A | | 7/1999 | Rueter | |
| 6,527,070 B2 | * | 3/2003 | Ryan | 180/6.7 |
| 6,848,753 B2 | * | 2/2005 | Tanaka | 303/9.62 |
| 7,244,001 B2 | * | 7/2007 | Rouillard et al. | 303/113.2 |
| 7,517,026 B1 | * | 4/2009 | Herbst et al. | 303/3 |
| 8,014,927 B2 | * | 9/2011 | Uematsu | 701/71 |
| 8,544,962 B2 | * | 10/2013 | Ganzel | 303/11 |
| 2008/0183353 A1 | | 7/2008 | Post et al. | |
| 2008/0230337 A1 | | 9/2008 | Kajiyama et al. | |
| 2013/0038118 A1 | * | 2/2013 | Brinkley et al. | 303/9.62 |

FOREIGN PATENT DOCUMENTS

| | | |
|---|---|---|
| FR | 2843926 A1 | 3/2004 |
| WO | 9714592 A1 | 4/1997 |

OTHER PUBLICATIONS

O'Dea, Anti-Lock Braking Performance and Hydraulic Brake Pressure Estimation. 2005 (17 pages).
WABCO, Operation of pneumatic braking systems. Basic Training. (16 pages).
European Search Report, dated Jan. 3, 2014 (7 pages).

* cited by examiner

*Primary Examiner* — Thomas J Williams

(57) ABSTRACT

A vehicle brake system includes a pump, a sump, brake units and left and right manually operated brake valves. The brake system also includes, for each brake unit, a solenoid operated on-off valve having a first port connected to a pilot of one of the brake valves, a second port, a third port connected to one of the brake units, a solenoid and a spring which opposes the solenoid. The brake system also includes, for each brake unit, a solenoid operated proportional valve. Each proportional valve controls communication between the pump, the sump and the second port of a corresponding one of the on-off valves.

12 Claims, 2 Drawing Sheets

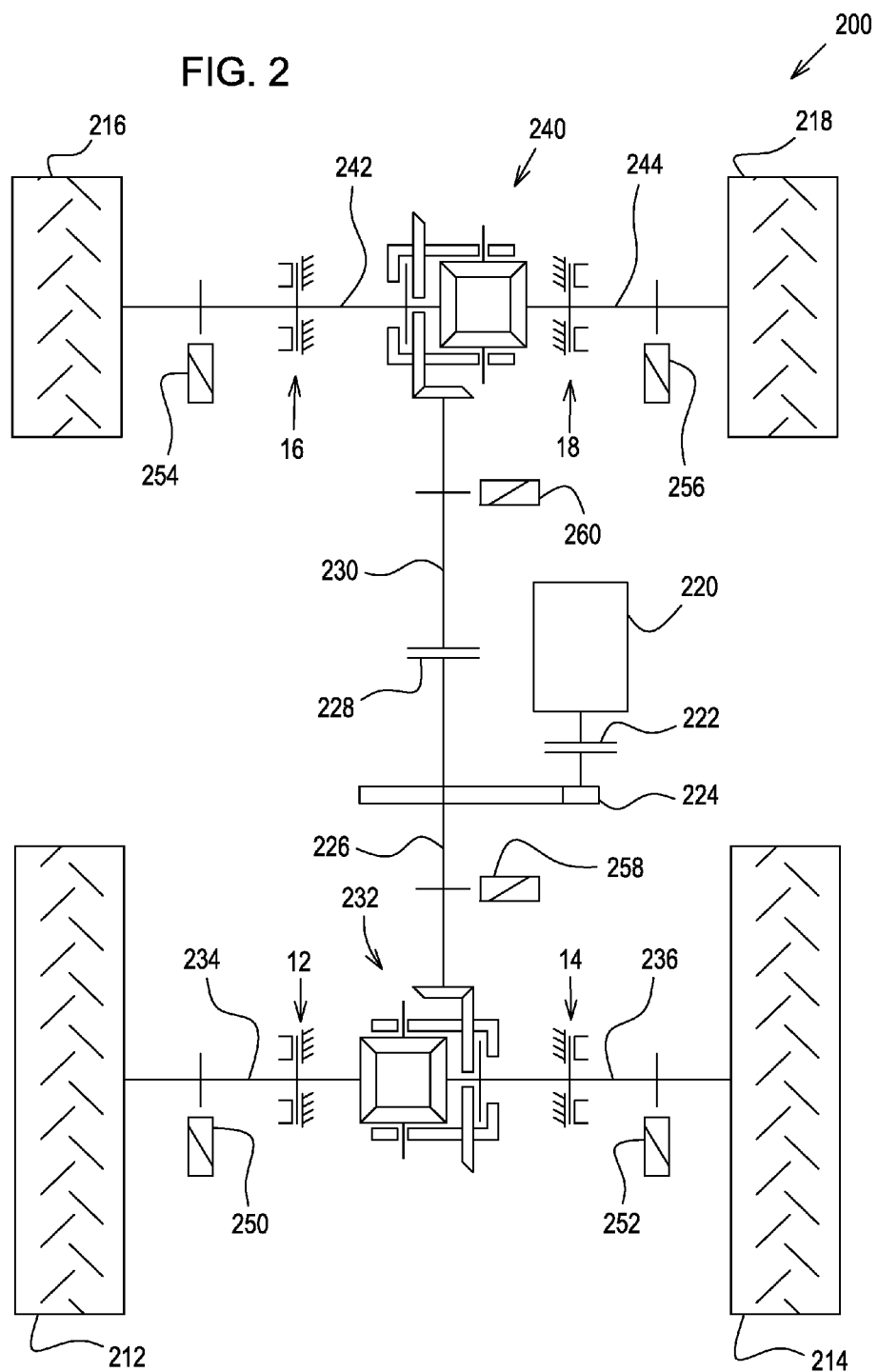

TRACTOR HYDRAULIC BRAKE CIRCUIT WITH ABS CAPABILITY

FIELD

The present disclosure relates to a hydraulic brake circuit for a tractor, and more specifically, to such a circuit which enables an anti-lock braking function (ABS).

BACKGROUND

Today, ABS and brake stability control systems are required for many on-road vehicles. Since the use of agricultural tractors in on-road transport operations is increasing, there is a push to implement new regulations that will require the use of ABS on some classes of agricultural tractors.

Many of the ABS systems used today for on road vehicles are based on pneumatics (trucks), or very low compliance air cooled hydraulic systems (automobiles). The brake systems used on agricultural tractors are hydraulic, but require approximately ten times more oil than an automobile. This additional oil is needed to accommodate the high running clearances needed for the oil cooled brake systems common on agricultural tractors. Others have demonstrated agricultural tractor ABS systems that utilize components from pneumatic truck brake systems. This approach is not desired as the base braking system on agricultural tractors is hydraulic. Also, the driveline of an agricultural tractor is very different than a truck or automobile. Typically, when the brakes are applied on an agricultural tractor, the mechanical front wheel drive (MFWD) clutch is closed which directly couples the front and rear axles similar to locking the transfer case on a four wheel drive truck. This configuration makes it very difficult to control ABS when braking in a condition wherein the right and left wheels are on different surfaces and have different coefficients of friction (a "split-mu" condition). An example of a split mu situation is when the vehicle right wheels are on a gravel shoulder of the road and the left wheels are on pavement. If the brakes are applied in this condition, the ABS system needs to respond differently on the right wheels from the left wheels.

It would be desirable to provide a hydraulic brake control circuit which controls the brakes on an agricultural tractor and which enables ABS and stability control functionality.

SUMMARY

According to an aspect of the present disclosure, a vehicle brake system includes a hydraulic pump, a sump, left and right rear brake units, left and right front brake units, and left and right manually operated brake valves. Each brake valve includes a pressure responsive pilot acting in opposition to a left manual actuator. The brake system also includes, for each brake unit, a solenoid operated on-off valve having a first port connected to a pilot of one of the brake valves, a second port, a third port connected to one of the brake units, a solenoid and a spring which opposes the solenoid. The brake system also includes, for each brake unit, a solenoid operated proportional valve. Each proportional valve controls communication between the pump, the sump and the second port of a corresponding one of the on-off valves.

BRIEF DESCRIPTION OF THE DRAWINGS

FIG. 2 is a simplified schematic diagram of vehicle drive train components suitable for use with the invention.

DETAILED DESCRIPTION OF THE DRAWINGS

Figure 1:
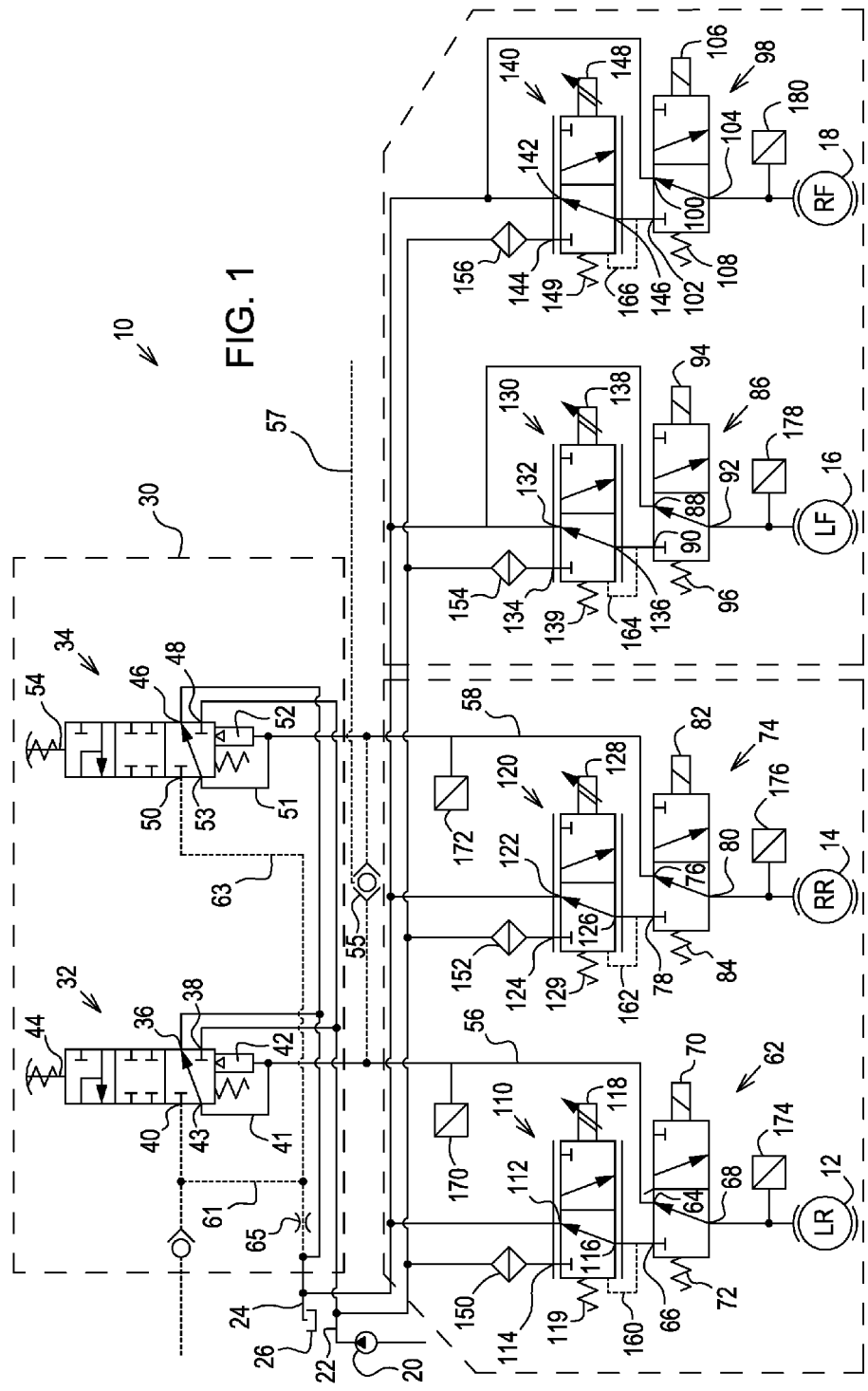
FIG. 1 is a schematic diagram of a hydraulic brake system which embodies the invention.

Referring to FIG. 1, a vehicle (not shown), such as a tractor, includes a electro-hydraulic brake control circuit 10 which controls the pressurization of a left rear brake unit 12, a right rear brake unit 14, a left front brake unit 16 and a right front brake 18. An engine driven pump 20 supplies pressurized hydraulic fluid to a pressure line 22. A return line 24 is connected to a sump 26. A conventional brake valve unit 30 includes left and right pedal operated brake valves 32 and 34. Valves 32 and 34 are 3-position 2-way valves. Valve 32 has a return port 36, a pump port 38, a load sense port 40 and pressure-responsive pilot 42 which acts is opposition to the pedal 44. Valve 34 has a return port 46, a pump port 48, a load sense port 50 and pressure-responsive pilot 52 which acts is opposition to the pedal 54. Pilot line 56 is connected to pilot 42. Pilot line 58 is connected to pilot 52. A pressure feedback line 41 connects pilot line 56 to a fourth port 43 of valve 32. A pressure feedback line 51 connects pilot line 58 to a fourth port 53 of valve 34. A shuttle valve 55 connects pilot lines 56 and 58 to a trailer brake pilot line 57. Ports 40 and 50 are connected to return line 24 by lines 61 and 63 and by a restriction 65.

A solenoid operated left rear on-off valve 62 has a first port 64 connected to pilot line 56, a second port 66, a third port 68 connected to left rear brake unit 12, a solenoid 70 and a spring 72 which opposes the solenoid 70. A solenoid operated right rear on-off valve 74 has a first port 76 connected to pilot line 58, a second port 78, a third port 80 connected to right rear brake unit 14, a solenoid 82 and a spring 84 which opposes the solenoid 82.

A solenoid operated left front on-off valve 86 has a first port 88 connected to return line 24, a second port 90, a third port 92 connected to left front brake unit 16, a solenoid 94 and a spring 96 which opposes the solenoid 94. A solenoid operated right front on-off valve 98 has a first port 100 connected to return line 24, a second port 102, a third port 104 connected to right front brake unit 18, a solenoid 106 and a spring 108 which opposes the solenoid 106.

A solenoid operated left rear proportional valve 110 has a first port 112 connected to return line 24, a second port 114 connected to pump line 22, a third port 116 connected to second port 66 of valve 62, a solenoid 118 and a spring 119 which opposes the solenoid 118. A solenoid operated right rear proportional valve 120 has a first port 122 connected to return line 24, a second port 124 connected to pump line 22, a third port 126 connected to second port 78 of valve 74, a solenoid 128 and a spring 129 which opposes the solenoid 128. A solenoid operated right rear proportional valve 130 has a first port 132 connected to return line 24, a second port 134 connected to pump line 22, a third port 136 connected to second port 90 of valve 86, a solenoid 138 and a spring 139 which opposes the solenoid 138. A solenoid operated right rear proportional valve 140 has a first port 142 connected to return line 24, a second port 144 connected to pump line 22, a third port 146 connected to second port 102 of valve 98, a solenoid 148 and a spring 149 which opposes the solenoid 148. Filters 150, 152, 154 and 156 are connected between the pump line 22 and the second ports of valves 110, 120, 130 and 140, respectively. Each of valves 110, 120, 130 and 140 also includes a pressure feedback line 160, 162, 164 and 166 which connects the third port of each valve to and end of the valve opposite its respective solenoid.

Pressure sensors 170 and 172 are connected to pilot lines 56 and 58, respectively. Pressure sensors 174, 176, 178 and 180 are connected to brake units 12, 14, 16 and 18, respectively.

Thus, each wheel brake 12-18 has an individual electro-hydraulic pressure control valve which can be used for both ABS and stability control functionality. Pressure control is needed due to the high regulatory compliance of agricultural tractor brake systems.

Referring now to FIG. 2, a vehicle drive train assembly 200 includes a left rear wheel 212, a right rear wheel 214, left front wheel 216, a right front wheel 218. An engine 220 is connected through a main clutch 222 to a transmission 224, which drives a rear drive shaft 226, and drives a front drive shaft 230 though mechanical front wheel drive (MFWD) clutch 228.

A rear differential 232 connects the rear drive shaft 226 with a left rear axle 234 and a right rear axle 236. A front differential 240 connects the front drive shaft 230 with a left front axle 242 and a right front axle 244. Each brake unit 12-18 is coupled to the corresponding one of axles 234, 236, 242 and 244. The assembly 200 also includes a left rear wheel speed sensor 250, a right rear wheel speed sensor 252, a left front wheel speed sensor 254, a right front wheel speed sensor 256, rear drive shaft speed sensor 258 and a front drive shaft speed sensor 260. An electronic control unit (not shown) controls the solenoid operated valves of FIG. 1 to provide anti-lock brake operation in a known manner.

Each pressure control valve is accompanied by an electro-hydraulic on-off or shutoff valve. The shutoff valves provide the redundancy needed to insure that the electro-hydraulic proportional valve is isolated in the event of a single point failure. Diagnostic coverage of the pressure control valve and shutoff valve is accomplished through the use of a pressure sensor located at each brake unit or actuator 12-18. On the rear axle, the shutoff valves 62 and 74 also isolate the power fill service brake valves 32 and 34 from the brake units 12-18 during an ABS or stability control event. On the front axle, the right and left brake units 16 and 18 can either be controlled independently or from a common EH proportional brake valve. When controlled from a common front brake valve, the system is only suitable for ABS control (no stability control).

The electro-hydraulic brake control system described above can be used for implementing anti-lock braking and stability control on an agricultural tractor. Normally, the MFWD clutch is closed when braking on an agricultural tractor. When a split mu condition is detected using the right and left side wheel speed sensors, the MFWD clutch is opened. This allows the rear axle braking to be controlled independent of the front axle braking. If the front axle is controlled with one valve (ABS only system), then the front diff-lock is energized in the split mu condition. In this configuration, only one speed sensor on the front drive shaft is required.

The brake control system described above provides control for all wheels in the ABS and stability control modes. It satisfies the need for a fail-safe requirement for safety critical control systems. This circuit also provides sensor locations and valve configurations which permit a simple ABS only configuration.

While the disclosure has been illustrated and described in detail in the drawings and foregoing description, such illustration and description is to be considered as exemplary and not restrictive in character, it being understood that illustrative embodiments have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

We claim:

1. A vehicle brake system comprising:
a hydraulic pump;
a sump;
a left brake pedal;
a right brake pedal operable independently of the left brake pedal;
a left brake unit;
a right brake unit;
a left manually operated brake valve operable only by the left brake pedal and having a first pressure responsive pilot acting in opposition to a left manual actuator;
a right manually operated brake valve operable only by the right brake pedal and having a second pressure responsive pilot acting in opposition to a right manual actuator;
a solenoid operated left on-off non-proportional valve having a first port connected to the first pilot, a second port, a third port connected to left brake unit, a solenoid and a spring which opposes the solenoid;
a solenoid operated right on-off non-proportional valve having a first port connected to the second pilot, a second port, a third port connected to right brake unit, a solenoid and a spring which opposes the solenoid;
a pair of solenoid operated proportional valves, each proportional valve controlling communication between the pump, the sump and the second port of a corresponding one of the on-off valves.

2. The brake system of claim 1, further comprising:
a pair of brake pressure sensors, each brake pressure sensor being connected to a corresponding one of the brakes and generating a corresponding brake pressure signal.

3. The brake system of claim 1, further comprising:
a pair of pilot pressure sensors, each pilot pressure sensor being connected to a corresponding one of the pressure responsive pilots and generating a corresponding pilot pressure signal.

4. The brake system of claim 1, wherein:
each proportional valve includes a pressure feedback line which acts in opposition to the solenoid and which is connected the second port of the corresponding on-off valve.

5. The brake system of claim 1, wherein:
a filter is connected the pump and each of the proportional valves.

6. The brake system of claim 1, wherein:
each proportional valve includes a first port connected to the sump, a second port connected to the pump and a third port connected to the second port, of the corresponding on-off valve.

7. A vehicle brake system comprising:
a hydraulic pump;
a sump;
a left brake pedal;
a right brake pedal operable independently of the left brake pedal;
a left rear brake unit;
a right rear brake unit;
a left front brake unit;
a right front brake unit;

a left manually operated brake valve operable only by the left brake pedal and having a first pressure responsive pilot acting in opposition to a left manual actuator;

a right manually operated brake valve operable only by the right brake pedal and having a second pressure responsive pilot acting in opposition to a right manual actuator;

a solenoid operated left rear on-off non-proportional valve having a first port connected to the first pilot, a second port, a third port connected to left rear brake unit, a solenoid and a spring which opposes the solenoid;

a solenoid operated right rear on-off non-proportional valve having a first port connected to the second pilot, a second port, a third port connected to right rear brake unit, a solenoid and a spring which opposes the solenoid;

a solenoid operated left front on-off non-proportional valve having a first port connected to the sump, a second port, a third port connected to left front brake unit, a solenoid and a spring which opposes the solenoid;

a solenoid operated right front on-off non-proportional valve having a first port connected to the sump, a second port, a third port connected to right front brake unit, a solenoid and a spring which opposes the solenoid; and a plurality of solenoid operated proportional valves, each proportional valve controlling communication between the pump, the sump and the second port of a corresponding one of the on-off valves.

8. The brake system of claim 7, further comprising:

a plurality of brake pressure sensors, each brake pressure sensor being connected to a corresponding one of the brakes and generating a corresponding brake pressure signal.

9. The brake system of claim 7, further comprising:

a pair of pilot pressure sensors, each pilot pressure sensor being connected to a corresponding one of the pressure responsive pilots and generating a corresponding pilot pressure signal.

10. The brake system of claim 7, wherein:

each proportional valve includes a pressure feedback line which acts in opposition to the solenoid and which is connected the second port of the corresponding on-off valve.

11. The brake system of claim 7, wherein:

a filter is connected the pump and each of the proportional valves.

12. The brake system of claim 8, wherein:

each proportional valve includes a first port connected to the sump, a second port connected to the pump and a third port connected to the second port of the corresponding on-off valve.

\* \* \* \* \*